United States Patent [19]
Christopher, Jr. et al.

[11] 3,868,999

[45] Mar. 4, 1975

[54] METHOD FOR PREFERENTIALLY PRODUCING PETROLEUM FROM RESERVOIRS CONTAINING OIL AND WATER

[75] Inventors: Charles A. Christopher, Jr., Houston; Abdus Satter, Conroe, both of Tex.

[73] Assignee: Texaco Inc., New York, N.Y.

[22] Filed: Dec. 27, 1972

[21] Appl. No.: 318,786

[52] U.S. Cl............................ 166/292, 166/305 R
[51] Int. Cl............................................. E21b 33/13
[58] Field of Search......... 166/270, 292, 294, 305 R

[56] References Cited
UNITED STATES PATENTS

| | | | |
|---|---|---|---|
| 2,356,205 | 8/1944 | Blair et al. | 166/305 R |
| 3,131,075 | 4/1964 | Brooks | 166/293 |
| 3,308,885 | 3/1967 | Sandiford | 166/305 R |
| 3,554,288 | 1/1971 | Ross | 166/305 R |
| 3,587,737 | 6/1971 | Tosch | 166/294 |
| 3,653,442 | 4/1972 | Ross | 166/305 R |
| 3,721,295 | 3/1973 | Bott | 166/294 |
| 3,756,319 | 9/1973 | Holm et al. | 166/305 R |

OTHER PUBLICATIONS
"The Condensed Chemical Dictionary", 1971, p. 148.

Primary Examiner—Stephen J. Novosad
Assistant Examiner—Jack E. Ebel
Attorney, Agent, or Firm—T. H. Whaley; C. G. Ries

[57] ABSTRACT

In a producing oil well wherein there is a large amount of water production the relative permeability to water may be lowered in relation to the relative permeability of oil by injecting into the formation around the well a slug of fluid comprising a hydrocarbon solvent, colloidal silica, water and a polymeric material and returning the well to production.

5 Claims, 1 Drawing Figure

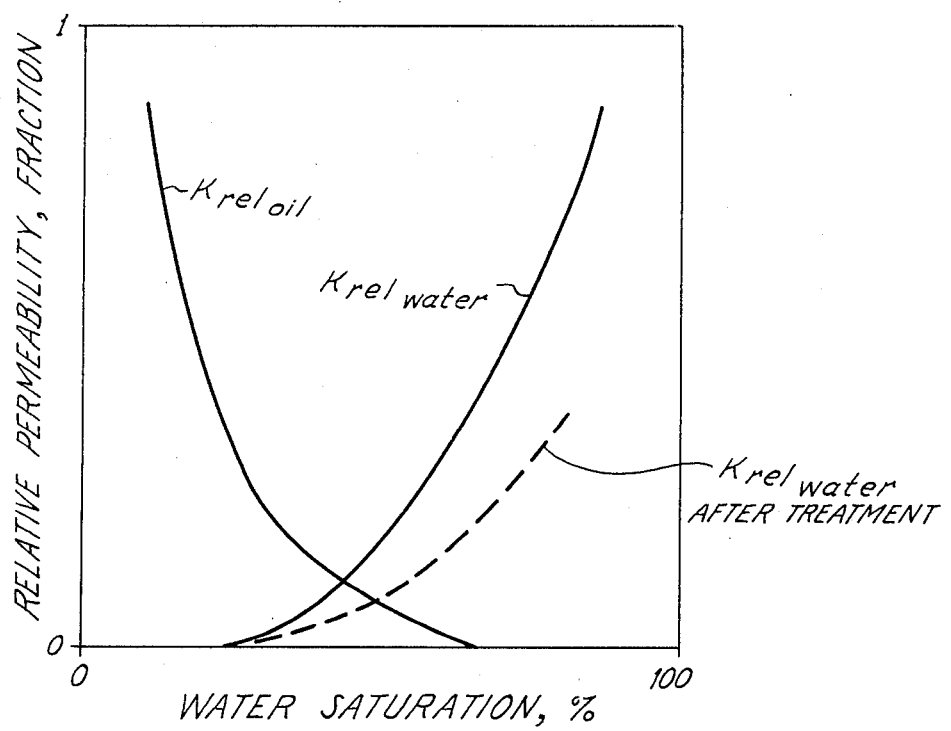

METHOD FOR PREFERENTIALLY PRODUCING PETROLEUM FROM RESERVOIRS CONTAINING OIL AND WATER

BACKGROUND OF THE INVENTION

1. Field of the Invention

This invention pertains to the field of oil recovery.

2. Description of the Prior Art

Petroleum in subterranean reservoirs, hereinafter referred to as oil, is often accompanied at production wells by encroaching water. This encroaching water may come, for example, from a large expanding aquifer. On the other hand water may have been injected into the reservoir to drive oil toward a production well as part of a secondary recovery operation. The recovery of this oil associated with large amounts of water is complicated by many factors. One factor is the retentive forces tending to keep the oil from moving toward a production well. These factors are viscosity and capillarity. The other factor complicating the production of this oil is the fact that normal production methods in the reservoir where water encroachment has taken place will tend to produce large amounts of water along with the oil. This water presents a problem of disposal in handling which greatly affects the economics of an oil recovery program.

In addition to oil production, the water in the reservoir will also be produced in large quantities as discussed above. The relative permeability of oil and water increases sharply in favor of water at large water saturations. A fluid may be injected into the production well to increase the viscosity of water and thereby lower its relative permeability. However, if the fluid is not miscible with the oil the retentive forces of capillarity will not be removed, and the fluid will finger through the oil and an uneven area will be affected. To remove the retentive forces of capillarity, for example, it is necessary to use a fluid which is miscible with the oil. If the displacing fluid is miscible with the reservoir oil the interface between the oil and displacing fluid will be removed and, therefore, so will the retentive forces of capillarity.

If on the other hand the viscosity of the fluid to be injected is less than the water around the well bore, the fluid will finger through the water around the well bore and push it back unevenly. This can occur, for example, if a light solvent is used in the injection fluid. If the viscosity of this solvent is less than the water in the reservoir, the solvent will actually finger through the water in an uneven fashion. The effects of viscosity may be described in terms of the mobility ratio. The mobility ratio is defined by the following equation:

$$M = (K_2/u_2)/(K_1/u_1)$$

where $M$ = mobility ratio $u_2, u_1$ = viscosity of injected fluid and water, respectively.

$K_2, K_1$ = permeability of the formation with respect to the injected fluid and the water, respectively.

At high mobility ratios the phenomenon commonly known as "fingering" occurs and injected fluid does not display a flat front to the reservoir oil but instead rushes ahead at various points in finger-like protrusions. The water in areas not touched by the fingers of displacing fluid are usually left uneffected by the injected fluid. The preceding equation shows that the mobility ratio and the degree of fingering is directly proportional to the ratio of the water viscosity to the displacing fluid viscosity $u_1/u_2$. Since light solvents are generally less viscous than water the mobility ratio will usually be quite high and a poor aerial sweep efficiency of the injected fluid will occur around the well bore.

SUMMARY OF THE INVENTION

The invention is a method for increasing the relative permeability to oil in relation to water in the vicinity around a production well penetrating a subterranean hydrocarbon bearing reservoir by injecting into the reservoir around the production well a slug of a fluid comprising a hydrocarbon solvent, colloidal silica, water and a polymeric material and then returning the well to production. The invention is also the novel injection fluid.

BRIEF DESCRIPTION OF THE DRAWING

The drawing depicts typical relative permeability curves of oil and water with water saturation in the reservoir before and after treatment by the method of our invention.

DESCRIPTION OF THE PREFERRED EMBODIMENTS

It often happens that a subterranean oil reservoir will contain a large amount of water or aqueous fluid such as brine in addition to the oil. This water or aqueous fluid may have originated from natural sources such as an aquifer or it may have been introduced by artificial means.

In a reservoir containing large amounts of water as well as oil the mobility of water ($K_w/u_w$, water effective permeability/water viscosity) is very large compared with the mobility of oil ($K_o/u_o$, oil effective permeability/oil viscosity). Our invention will reduce the mobility of water relative to oil by decreasing the relative permeability to water. This will be accomplished by increasing the relative permeability to oil by increasing the oil saturation around the well bore with a solvent miscible with the reservoir oil and decreasing the relative permeability to water with a polymer. The results are a greater oil to water ratio in the produced fluids from the reservoir. These things will be accomplished by injecting a novel fluid into the formation around the well bore of a production well and then returning the well to production.

The novel fluid comprises a solvent for the petroleum, thickened with colloidal silica or some other suitable material to increase the viscosity of the solvent to the range of the reservoir oil and emulsified with a water or brine solution of a high molecular weight polymer. Preferably, a surfactant or multi-functional material is added to improve the stability of the emulsion and to reduce the surface tension holding the oil to mineral surfaces.

By way of explanation of the effects of such a fluid slug on the reservoir fluids the following is offered. However, the operation of our invention is not meant to be limited to specific mechanisms and the following is offered only to enable those skilled in the art to better understand our invention.

1. The oil miscible thickened slug forms a stable front against the fluids around the well bore and prevents any fingering of the slug. This allows the slug to form a uniform "bubble" around the well bore and evenly affect the area.

2. The solvent in the slug increases the oil saturation around the well bore and thus decreases the water saturation. This has the effect of increasing the oil relative permeability.

3. The polymer in the water portion of the slug increases the viscosity of the formation water by migrating to it and remaining physically attached to the formation. This decreases the relative permeability to water.

The size of the injected slug may vary over wide limits dictated by reservoir conditions. The size of the slug is not critical to our invention as long as enough fluid is present to affect a sufficient radius around the well bore. For example, a slug which encompasses a ten foot radius around the well bore should be satisfactory. Smaller or larger slugs may have the desired effect in a given situation, however.

The hydrocarbon solvent component of the slug of our invention must be a solvent for the reservoir hydrocarbons, that is, it must be miscible with the reservoir hydrocarbons. Examples of typical, suitable hydrocarbons are aromatics such as benzene and toluene and aliphatics such as LPG, propane, butane, isobutane, pentane, isopentane and hexane. Also, any mixture of suitable hydrocarbon solvents which when mixed retain their miscibility characteristics with the reservoir hydrocarbons are acceptable. An especially useful solvent would be a light cut from lease crude. Other solvents will occur to those skilled in the art without departing from the scope of our invention.

Colloidal silica is preferred as a thickener for the solvent portion of the slug in our invention. The colloidal silica acceptable for use in the method of this invention should have a particle size ranging from about 7 to 15 millimicrons (mu). In this size range the colloidal silica will pass through even reservoirs with very small pore sizes. For example, a reservoir having very low permeability of say 0.16 millidarcies (md) has a correspondingly small pore size of 25 to 100 microns. Thus, the colloidal silica suitable for use in the process of this invention will pass through even the smallest pores encountered in subterranean hydrocarbon reservoirs and will maintain a constant viscosity in the fluid.

The colloidal silica useful in our invention is different from precipitated silica or silica gel. The colloidal silica useful in our invention is a fumed silica which is made up of chain-like formations sintered together. These chains are branched and have enormous external surface areas of from about 50 to about 400 meters$^2$/gram. Each segment in the chain has many hydroxyl (OH) groups attached to silicon atoms at the surface. When the segments come into proximity to each other these hydroxy groups will bond to each other by hydrogen bonding to form a three-dimensional network. Colloidal silicas are readily available commercially. One source is the Cabot Corporation of Boston, Mass. under the trade name CAB-O-SIL. Colloidal silica is also available from other commercial sources and the reference to one source is not intended to limit the scope of our invention.

When the silica particles are dispersed in a liquid medium, the network structure formed by the silica particles restricts the movement of the molecules of the liquid medium. This in turn results in an increase in the viscosity of the liquid.

It is known that the thickening efficiency of the silica is directly related to the polarity of the liquid to be thickened. The use of selected additives (surfactants and/or multi-functional compounds) can increase the thickening efficiency of the silica. In the case of the hydrocarbon solvents, these additives react with the interface between the silica and the solvent and increase the degree to which the silica particles form the three-dimensional network. This allows less silica to be used to achieve equivalent thickening of the solvents. Usually less than 0.5% of the additive based on the weight of total liquid to be thickened will achieve marked increases in viscosity. The use of these optional additives may not be necessary to the successful operation of our invention. However, they may be used to optimize the efficiency of the thickening process.

The surfactant which may be used in the slug of our invention may broadly be any compound which reduces surface tension of the water, thus reducing the surface tension between the water and the reservoir oil. Soap may be used for instance, the sodium salts of high molecular weight alkyl sulfates or sulfonates. Also, very useful are nonionic surfactants which are usually a reaction product of a hydrophobic and a hydrophylic material such as the reaction product between mixed monoalkyl phenols and ethylene oxide. For example, low polarity liquids such as most hydrocarbon solvents are normally thickened by the use of anionic surfactants such as sodium linear alkyl sulfonates and multi-functional compounds such as a glycol. Ethylene glycol, propylene glycol are typical examples of useful multi-functional compounds which may be used. Other equivalents will be apparent to one skilled in the art.

The water portion of the slug of this invention may be fresh water or water containing various degrees of inorganic salts such as brine.

The polymer portion of the slug of our invention may be any polymer which will reduce the relative permeability to water of the formation. The polymer will migrate from the slug into the water present in the reservoir to accomplish the permeability reduction. Typical examples of suitable polymers include polyacrylamides having from about 0 to about 75% of the amide groups hydrolyzed to carboxylate groups. It is preferred to have from about 0 to about 30% of the amide group hydrolyzed to carboxylate groups. Especially preferred is a polyacrylamide of greater than 6 million molecular weight and approximately 5% of the amide groups hydrolyzed. Polysaccharides are also polymers useful in our invention. For example, a commercially available material is Kelzan MF (a xanthan gum produced by the action of the bacterium xanthomonas campestris). Modifications of polysaccharides to increase their ionic character will make them even more useful in our invention.

Another type of polymer useful in our invention are water soluble starch derivatives containing carboxyl sulfonate or sulfate groups in the form of sodium or ammonium salts. Other useful polymers include but are not limited to soluble cellulose derivatives, polyvinyl alcohol, polyvinyl pyrrolidone, poly (arylic acid), poly (ethylene oxide) and polyethyleneimines. This listing is not exhaustive. Various other polymers may be used without departing from the scope and spirit of our invention. The following is a typical method of preparing the novel fluid or slug of our invention. It is given for illustration only and is not intended to limit the scope of our invention in any way. Other methods of preparation will no doubt become apparent to one skilled in the art after learning from the teachings found herein.

FORMING THE NOVEL FLUID

To a volume of water is added 20% by weight colloidal silica with rapid stirring. A polar additive is added in an amount from 5 to 20 percent of the amount of colloidal silica added. Stirring forms a gel. The hydrocarbon solvent is added in an amount about equal to the original water volume with stirring. A solution of polymer in water is now added. The concentration of the polymer in the water will typically range from about 250 milligrams/liter (mg/l) to about 2,000 mg/l. A preferred concentration is about 750 mg/l.

The fluid described above may now be diluted with water and/or solvent to obtain a typical fluid having a viscosity of about 10 centipoise (cp). The fluid has the approximate composition: 100 mg/l polymer, 800 mg/l colloidal silica, 400 mg/l surfactant, 80% solvent and 20% water. The compositions possible are infinite and may be formulated using the above teachings by one skilled in the art.

One of the most critical criteria for formulating a fluid is the viscosity needed. The optimum viscosity of a driving slug is that which causes a mobility ratio of about one between the slug and the reservoir oil. The slug may be adjusted in viscosity by the general techniques previously described.

The FIGURE shows a typical set of relative permeability curves for oil and water in a hydrocarbon reservoir. As the water saturation increases the relative permeability to oil decreases and the relative permeability to water increases. The solid lines depict the relative permeabilities before treatment by the method of our invention. The dotted lines show that after treatment by the method of our invention the water relative permeability curve is lowered at any given water saturation. In addition, after such treatment the water saturation is decreased. Therefore, a two fold improvement is accomplished in maximizing the ratio of relative permeability to oil over the relative permeability to water.

We claim:

1. A method for increasing the relative permability to oil and decreasing the relative permeability to water in the vicinity around a production well penetrating a subterranean hydrocarbon reservoir comprising:

injecting a slug of fluid into the reservoir via the production well the fluid comprising a hydrocarbon solvent, colloidal silica, water and a polymeric material and returning the well to production.

2. A method as in claim 1 wherein the fluid is injected in an amount sufficient to encompass the radius around the production well of about ten feet or more.

3. A method as in claim 1 wherein the fluid also contains a surfactant.

4. A method as in claim 1 wherein the fluid also contains a multi-functional compound.

5. A method as in claim 1 wherein the fluid also contains a surfactant and a multi-functional compound.

* * * * *